US012749299B2

(12) United States Patent
Glapa et al.

(10) Patent No.: US 12,749,299 B2
(45) Date of Patent: Sep. 29, 2026

(54) INTERACTIVE TOOLS TO IDENTIFY AND LABEL OBJECTS IN VIDEO FRAMES

(71) Applicant: Micron Technology, Inc., Boise, ID (US)

(72) Inventors: Michael Cody Glapa, Washington, DC (US); Abhishek Chaurasia, Bellevue, WA (US); Eugenio Culurciello, West Lafayette, IN (US)

(73) Assignee: Micron Technology, Inc., Boise, ID (US)

( * ) Notice: Subject to any disclaimer, the term of this patent is extended or adjusted under 35 U.S.C. 154(b) by 372 days.

(21) Appl. No.: 17/721,744

(22) Filed: Apr. 15, 2022

(65) Prior Publication Data

US 2022/0351503 A1 Nov. 3, 2022

Related U.S. Application Data

(60) Provisional application No. 63/182,414, filed on Apr. 30, 2021.

(51) Int. Cl.

| | |
|---|---|
| ***G06V 10/778*** | (2022.01) |
| ***G06T 7/11*** | (2017.01) |
| ***G06V 10/82*** | (2022.01) |

(52) U.S. Cl.

CPC ................ *G06V 10/82* (2022.01); *G06T 7/11* (2017.01); *G06V 10/7788* (2022.01)

(58) Field of Classification Search

CPC .... G06V 10/82; G06V 10/7788; G06V 20/52; G06V 20/70; G06T 7/11; G06F 3/04842; G06F 18/41; G06N 5/04

See application file for complete search history.

(56) References Cited

U.S. PATENT DOCUMENTS 8,224,029 B2 * 7/2012 Saptharishi .............. G06K 9/00 382/103
10,169,680 B1 * 1/2019 Sachdeva ............ G06F 3/04842
(Continued)

FOREIGN PATENT DOCUMENTS

KR 102175531 X 11/2020

OTHER PUBLICATIONS

Guresen et al, Definition of artificial neural networks with comparison to other networks, 2011, Procedia Computer Science 3(2011): 426-433. (Year: 2011).*
(Continued)

*Primary Examiner* — Kathleen M Broughton
(74) *Attorney, Agent, or Firm* — Greenberg Traurig

(57) ABSTRACT

A system, method and apparatus to label video images with assistance from an artificial neural network. After a user provides first inputs to label first aspects of an object shown in a first video frame, the artificial neural network infers or predicts second aspects to be labeled for the object in a second video frame. A graphical user interface presents the inferred or predicted second aspects over a display of the second video frame to allow the user to confirm or modify the inference or prediction. For example, an object of interest in the first frame can be labeled with a classification and a bounding box; and the artificial neural network is trained to infer or predict, for the corresponding object in the second frame, its bounding box, classification, and pixels representative of the image of the object in the second frame.

21 Claims, 5 Drawing Sheets

(56) References Cited

U.S. PATENT DOCUMENTS

| | | | | |
|---|---|---|---|---|
| 10,424,064 | B2 * | 9/2019 | Price | G06K 9/34 |
| 12,169,936 | B2 * | 12/2024 | Chaurasia | G06N 3/045 |
| 2010/0104191 | A1 * | 4/2010 | McGwire | G06K 9/46<br>382/190 |
| 2013/0170738 | A1 * | 7/2013 | Capuozzo | G06K 9/62<br>382/159 |
| 2017/0169314 | A1 * | 6/2017 | Dijkman | G06K 9/66 |
| 2017/0287443 | A1 | 10/2017 | Boyce | |
| 2018/0012082 | A1 * | 1/2018 | Satazoda | G06K 9/00 |
| 2018/0137649 | A1 * | 5/2018 | Schulter | G06T 7/73 |
| 2018/0268240 | A1 * | 9/2018 | Loce | G06K 9/32 |
| 2018/0300576 | A1 | 10/2018 | Dalyac et al. | |
| 2019/0057501 | A1 | 2/2019 | Lo et al. | |
| 2019/0304102 | A1 * | 10/2019 | Chen | G06T 7/246 |
| 2019/0340776 | A1 * | 11/2019 | Nash | G06T 7/521 |
| 2019/0362156 | A1 * | 11/2019 | Muppala | G06K 9/00 |
| 2020/0051252 | A1 * | 2/2020 | Brown | G06T 7/246 |
| 2020/0238991 | A1 * | 7/2020 | Aragon | G05B 13/027 |
| 2020/0364508 | A1 * | 11/2020 | Gurel | G06N 3/063 |
| 2021/0004589 | A1 * | 1/2021 | Turkelson | G06V 10/809 |
| 2021/0042530 | A1 | 2/2021 | Kim et al. | |
| 2021/0295534 | A1 * | 9/2021 | Cho | G06V 20/52 |

OTHER PUBLICATIONS

Wu et al, Development and Application of Artificial Neural Network, 2018, Wireless Pers Commun (2018) 102: 1645-1656. (Year: 2018).*

International Search Report and Written Opinion, PCT/US2022/025589, mailed on Aug. 9, 2022.

Qiang Wang, Li Zhang, Luca Bertinetto, Weiming Hu, Philip H.S. Torr, "Fast Online Object Tracking and Segmentation: A Unifying Approach", arXiv:1812.05050v2 [cs.CV], May 5, 2019.

SiamMask, github.com/foolwood/SiamMask, printed on Apr. 21, 2021.

Wang, Qiang, "Fast Online Object Tracking and Segmentation: A Unifying Approach." 2019 IEEE/CVF Conference on Computer Vision and Pattern Recognition, IEEE, Jun. 20, 2019.

Zhou, Jie, "A Visual Target Tracking Algorithm Based on Depth Learning." Journal of Inner Mongolia Normal University 9natural Sicence Edition), Abstract only, Mar. 15, 2018.

* cited by examiner

INTERACTIVE TOOLS TO IDENTIFY AND LABEL OBJECTS IN VIDEO FRAMES

RELATED APPLICATIONS

The present application claims priority to Prov. U.S. Pat. App. Ser. No. 63/182,414 filed Apr. 30, 2021, the entire disclosures of which application are hereby incorporated herein by reference.

TECHNICAL FIELD

At least some embodiments disclosed herein relate to interactive tools for processing video images in general, and more particularly, but not limited to identification and classification of objects in the video images.

BACKGROUND

An Artificial Neural Network (ANN) uses a network of neurons to process inputs to the network and to generate outputs from the network.

Deep learning has been applied to many application fields, such as computer vision, speech/audio recognition, natural language processing, machine translation, bioinformatics, drug design, medical image processing, games, etc.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to an interactive tool that assists a human operator in identifying and classifying objects captured in the video images of a video clip.

Training data is typically used to train an artificial neural network in identifying an object in an image and/or to classify an image of an object. To generate such training data, a human operator can identify an object and/or to classify the object to generate an expected result such that the artificial neural network can be trained via machine learning techniques to make the same identification and/or classification. It can be time consuming and tedious to generate the expected results for many frames of images in a video clip.

At least some aspects of the present disclosure address the above and other deficiencies and/or challenges by providing an interactive tool that assists a human operator in identifying and classifying objects captured in the video images of a video clip. The interactive tool allows the operator to view a frame of video image, identify an object of interest within the video image, and assign a classification to the object. The tool visually presents the object identifications and classifications by overlaying the indications of object identifications and classifications on the video image for inspection and/or adjustment by the operator. Based on the identification and classification of the objects in a frame, the tool uses an artificial neural network to predict/infer the identification and classification of objects in an adjacent video image, such as the previous image in the video stream, or the next image in the video steam. The adjacent video image is presented with inferences or predictions made using the artificial neural network for inspection and/or adjustment by the operator. The tool can playback the video clip, forward or in reverse, with the object identifications and classifications identified by the operator or the artificial neural network. The operator may stop the playback at any frame, provide inputs to make adjustments in object identification and/or classification in the frame, which adjustments can cause the artificial neural network to make updates in inferences or predictions for adjacent video images. For example, the operator can provide inputs to change the identification of the portion of an image that represents an object of interest. For example, the operator can provide inputs to change the classification of an object identified in an image. For example, the operator can provide inputs to identify a new object coming into a video image, or delete the identification of an object not of interest in the video image. With the assistance of the tool and the inferences or predictions made by the artificial neural network, the human operator can complete the task of identifying objects captured in the video clip and classifying the objects with less effort and time.

Figure 1:
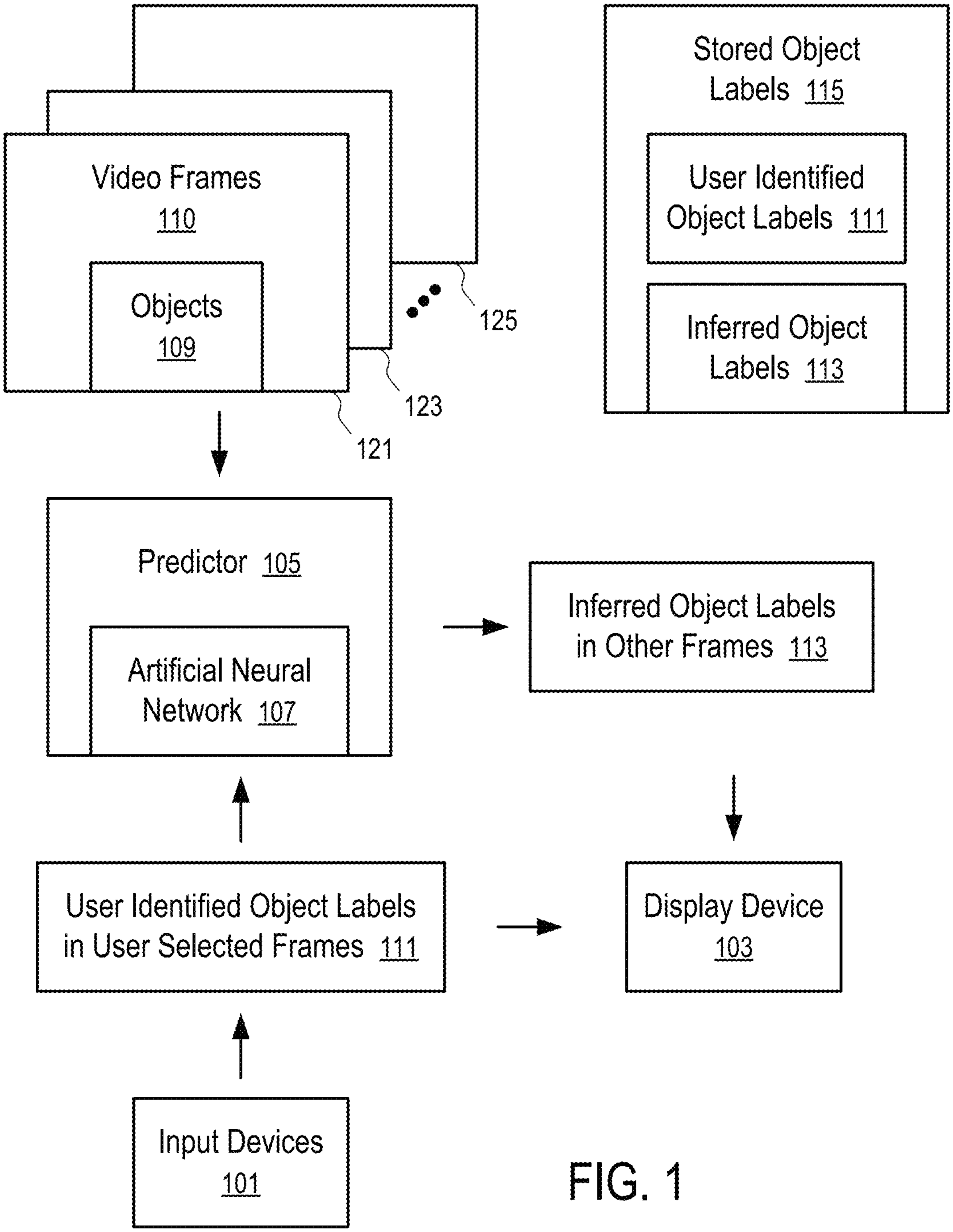
FIG. 1 illustrates a technique to identify and label objects in video images according to one embodiment.

FIG. 1 illustrates a technique to identify and label objects in video images according to one embodiment.

In FIG. 1, a video clip has a set of video frames 110. Each video frame can be rendered as an image (e.g., 121, 123, . . . , 125). When the video clip is played back, the sequence of video images 121, 123, . . . , 125 are presented one after another, typically at a predetermined frame rate. The video images 121, 123, . . . , 125 have a same size. An object 109 captured at one location in a video image (e.g., 121) can move to another location in another video image (e.g., 123 or 125). Some objects 109 can be in some of the video frames 110, but other in the others. Thus, when the video clip goes from one image (e.g., 121) to another image (e.g., 123), some objects 109 may disappear; and other objects may come into view.

An interactive tool having a predictor 105, input devices 101, and a display device 103 can be used to generate data representative of stored object labels 115. The stored object labels 115 identify, in the video frames 110, the portions of video images (e.g., 121, 123, . . . , 125) locations of objects 109 of interest, and their classifications.

For examples, objects of interest can be in a set of classifications (e.g., vehicle, human, animal, etc.). An object 109 in a video image 121 can occupy a set of pixels. The set of pixels representative of the object 109 is generally not in a region of a regular shape (e.g., rectangle). The location of the object 109 can be specified via a regular shape in the form of a bounding box. The stored object labels 115 can identify the bounding box of the pixels representative of the object 109 and/or the identification of the pixels representative of the object 109. Optionally, the stored object labels 115 of an object in a video image 121 can include an image of the object having the set of pixels representative of the object; and the image of the object is set on a transparent background, or a background of a predetermined color. Alternatively, the image representative of a mask of the set of pixels of the object in the video image (e.g., 121, 123, . . . , 125) can be stored for the object. The stored object labels 115 can include classifications of the object.

In FIG. 1, the stored object labels 115 include user identified object labels 111 and inferred object labels 113.

The interactive tool presents the video frames 110 on the display device 103. A user of the tool can use input devices 101 to provide user identified object labels 111 in user selected frames.

For example, the interactive tool can play back the video frames. The video images 121, 123, . . . , 125 can be presented in playback in the forward direction, or in the reverse direction. The user may stop the video at any frame to examine and label the video image (e.g., 121, 123, . . . , 125).

When the tool pauses the video at an image (e.g., 121 or 123), the user can use the input devices 101 to identify an object and assign a classification to the object 109. The object can be identified by drawing a bounding box around the object 109 in the image; and the tool can analyze the image within the bounding box to identify a set of pixels representative of the object. Thus, the pixels within the bounding box are separated into one set of pixels that belong to the object and another set of pixels that do not belong to the object. The tool can optionally overlay a mark of the pixels of the object (e.g., having a uniform semi-transparent color) on the video image (e.g., 121 or 123). Optionally, the tool can allow the user to adjust the marks by painting (e.g., using the semi-transparent color to add pixels to the object, or erasing a portion of the semi-transparent color to remove pixels from the object).

The tool can be used to a new object of interest in the video image (e.g., 121 or 123), to remove an object that is not of interest, to identify or change the bounding box of an object, to assign or change the classification of an object, and/or to fine tune the separation, within the bounding box, of pixels of the object and pixels not part of the object.

The labeling of the object can be visually presented on the video image (e.g., 121 or 123) for ease of verification and inspection.

Subsequently, the user can instruct the tool to play the video forward or backward.

When the tool goes to the next frame (e.g., before or after the current frame), the tool can determine whether the user has already labeled objects for the frame. If not, the tool can use the predictor 105 to generate the inferred object labels 113 using an artificial neural network 107. The prediction can be based on the objects 109 identified in the prior frame, the image of the prior frame, and the image of the current frame. The labeling of object in the prior frame can be user identified, or identified by the predictor 105 based on a further frame.

For example, based on the bounding box of the objects 109 in the prior frame (e.g., image 123 when playing the video backward, or image 121 when playing the video forward), the artificial neural network 107 can predict/infer the bounding boxes of the objects 109 in the current frame (e.g., image 121 when playing the video backward, or image 123 when playing the video forward), based on similarities between the prior and current frames. For example, after inferring/identifying the bounding boxes of the objects 109 in the current frames, the artificial neural network 107 can further predict/infer the sets of pixels within the bounding boxes that belong to the respective objects. The classifications of the objects 109 identified in the prior frame can be used as the classifications of the corresponding objects 109 identified in the current frame. Thus, the inferred object labels 113 reduces the human effort and time in labeling the current frame.

For example, a method known as SiamMask can be used to implement the predictor 105. For example, an artificial neural network can be trained to establish correspondence between pixels of an object in adjacent video frames, predict/infer the change of a bounding box, and class-agnostic binary segmentation. The outputs of the pixel correspondence, bounding box prediction, and image segmentation can be combined to identify, based on the bounding box of an object in one video frame, the bounding box of the object in the next video frame, and the pixels of the object in the next video frame. Alternatively and/or in combination, other methods of visual object tracking and/or video object segmentation (VOS) can be used.

Similar to the presentation of the user identified object labels 111 on the user selected frames, the inferred object labels can be presented in a similar way on other frames for user inspection, confirmation, and/or adjustment.

The user can instruct the tool to step forward or backward one image at a time (or a predetermined number of images/frames a time). For example, the user can press a left or up arrow key to request the tool to go backward to the next frame (or the next frame after skipping a predetermined number of intervening frames). For example, the user can press a right or down arrow key to request the tool to go forward to the next frame (or the next frame after skipping a predetermined number of intervening frames).

The tool can make the inferences or predictions in real time with the playing back of the video clip. Thus, the user can instruct the tool to play the video with the labeling continuously for inspection. When an incorrect label is observed, the user can instruct the tool to pause and optionally step forward or back forward to a frame. Then, the user can provide inputs to make adjustments, changes, additions and/or deletions to the labels presented on the frame. The user inputs can be used by the predictors 105 to make adjustments in inferred object labels 113 for adjacent video frames.

Figure 2:
FIGS. 2-4 illustrate an interactive tool to label objects in video images according to some embodiments.
Figure 3:
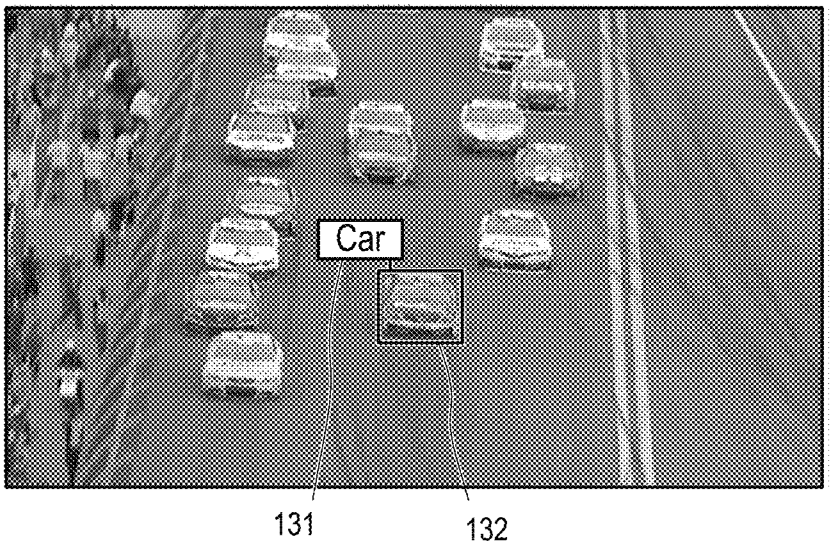
Figure 4:
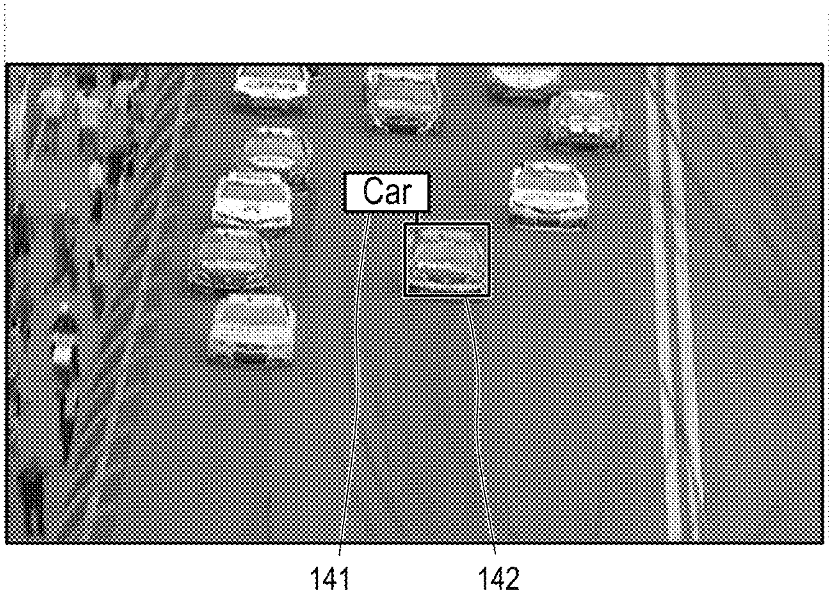

FIGS. 2-4 illustrate an interactive tool to label objects in video images according to some embodiments. For example, the tool illustrated in FIGS. 2-4 can be implemented using the technique of FIG. 1.

FIG. 2 illustrates a video frame that shows a number of objects of interest (e.g., cars). The user of the tool can visually inspect the video frame to identify an object of interest for labeling.

FIG. 3 illustrates the user drawing a bounding box 132 to identify an object of interest and assign a classification 131 of "Car" to the object.

For example, the user may select the box of the classification to obtain a menu list of options, each identified a classification, such that the user may assign an alternative classification to the object depicted within the bounding box.

Optionally, the user can delete the bounding box to indicate that the object within the previous bounding box is of no interest.

Optionally, the tool can perform an image segmentation operation for the portion of the image within the bounding box to identify the pixels corresponds to the object having the classification of "Car". The tool can paint a semi-transparent shadow of a color over the pixels identified as part of the image of the object having the classification of "Car".

Optionally, the user can click on the bounding box to request an interface to fine tune the identification of pixels that are identified to be the image of the object having the classification of "Car".

Subsequently, the user can instruct the tool to go to a next frame (e.g., playing forward or backward) to show the frame illustrated in FIG. 4. Based on the user labeling of the object in the bounding box 132 and the classification 131, the predictor 105 of the tool identifies the bounding box 142 for a corresponding object and its classification 141.

The labeling of the object in FIG. 4 (e.g., bounding box 142 and classification 141) is presented in a similar way as in FIG. 3; and the user of the tool can inspect the presentation to decide whether to make corrections.

When no user correction or adjustment is accepted, the inferred object labels 113 can be accepted and stored.

Figure 5:
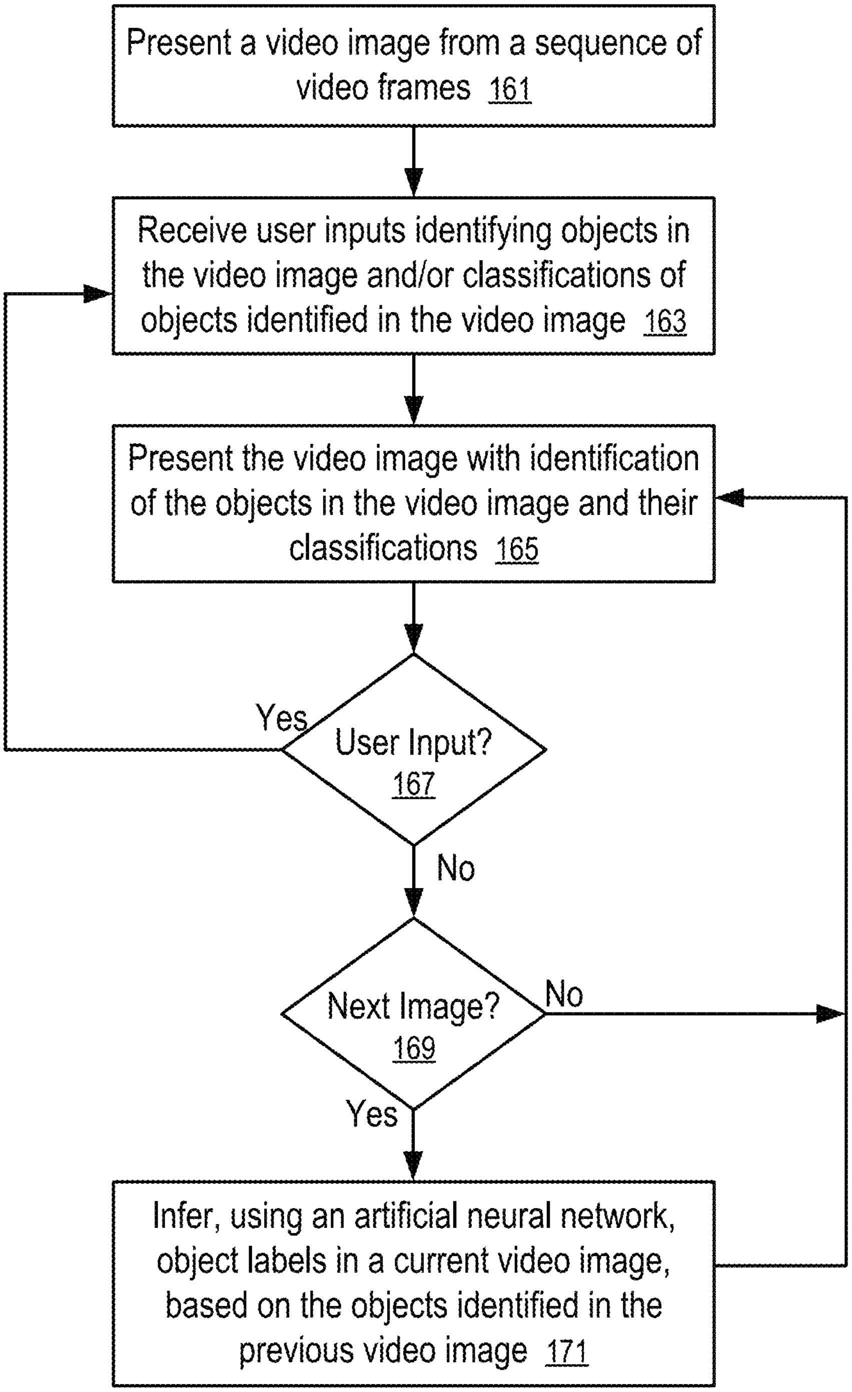
FIG. 5 shows operations to label objects in video images according to one embodiment.

FIG. 5 shows operations to label objects in video images according to one embodiment. For example, the operations of FIG. 5 can be implemented in a tool illustrated in FIGS. 2 to 4 and implemented using the technique of FIG. 1.

At block 161, an interactive tool provided on a computing system presents a video image (e.g., 121, 123, . . . , or 125) from a sequence of video frames 110. Each video image corresponds to one of the video frames 110.

At block 163, the interactive tool receives user inputs identifying objects 109 in the video image (e.g., 121, 123, . . . , or 125) and/or classifications (e.g., 131) of objects 109 identified in the video image (e.g., 121, 123, . . . , or 125).

For example, the user inputs can be received via input devices 101, such as a keyboard, a mouse, a touch pad, a touch screen, a microphone for voice inputs, a motion sensor for gesture inputs, etc.

For example, the user inputs can identify or modify a bounding box 132 to indicate that an object of interest is within the bounding box 132.

For example, the user inputs can specify or change a classification 131 of an object depicted within the bounding box 132 in the video image (e.g., 121, 123, . . . , or 125).

At block 165, the interactive tool presents the video image (e.g., 121, 123, . . . , or 125) with identification of the objects 109 in the video image and their classifications, as illustrated in FIG. 3.

If, at block 167, the interactive tool determines that additional user inputs have been received for labeling objects 109 in the current video image (e.g., 121, 123, . . . , or 125), the operations in blocks 163 and 165 can be repeated to generate or update user identified object labels 111 for the video image (e.g., 121, 123, . . . , or 125).

If, at block 169, the interactive tool determines to present and/or label the next image (e.g., in response to a command from the user to move forward or backward), the predictor 105 of the interactive tool predicts/infers, at block 171 using an artificial neural network 107, object labels 113 in a current video image, based on the objects identified in the previous video image. The prediction can be presented via the operation of block 165.

For example, if the user does not specify inputs to indicate which pixels within the bounding box 132 belong to the object 109 identified by the bounding box 132, the interactive tool can treat the same video image as a "next" image and predict/infer, based on the bounding box 132, the pixels that belong to the object having the classification 131. Optionally, the user of the interactive tool can provide inputs to adjust the pixel inferences or predictions made by the tool and thus convert the inferred user label to a user identified label.

For example, if the interactive tool goes to a video image/frame that has user identified label, the interactive tool prevents the predictor 105 from overwriting the label aspects that have been specified by the user. If the video image/frame has certain aspects that have not yet been specified by the user, the interactive tool uses the predictor 105 to provide an initial object labels 113 based on the inferences or predictions from the predictor 105. If certain aspects of the labels in a prior frame (e.g., immediately before or after the current video image/frame in the sequence of video frames 110 in the video clip) has been changed due to user inputs, the interactive tool can automatically update the inferred object labels 113 in the current video image/frame.

In some implementations, the inferred object labels 113 for a current image/frame is based on the bounding box 132 and classification 131 for an object in an adjacent image/frame, but not the identification of pixels of the object in the adjacent image/frame. The interactive tool automatically identifies pixels of objects 109 without user input specifying which pixels belong to objects of interest and which not.

In other implementations, the inferred object labels 113 is based on the bounding box 132 and classification 131 for an object in an adjacent image/frame, and the identification of pixels of the object in the adjacent image/frame. The user of the interactive tool can optionally provide inputs to fine tune the identification of pixels that belong to objects; and the predictor 105 can generate improved inferences or predictions based on the user input regarding the pixels of objects.

Figure 6:
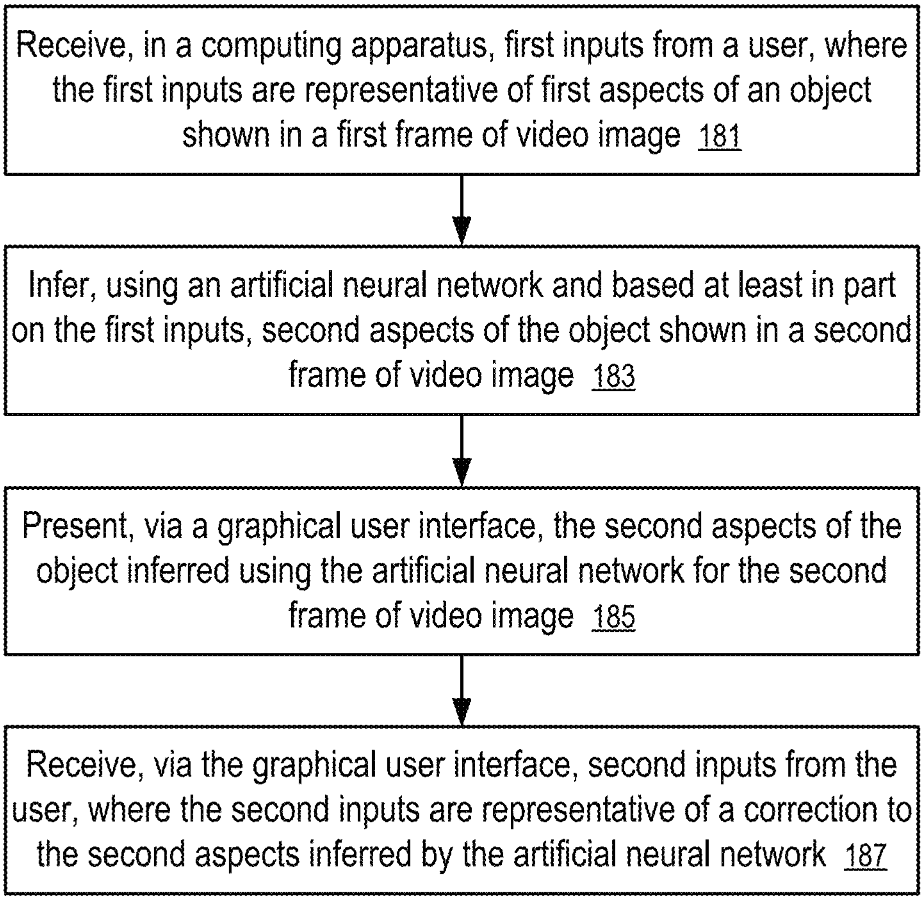
FIG. 6 shows a method to label objects according to one embodiment.

FIG. 6 shows a method to label objects according to one embodiment. For example, the operations of FIG. 5 can be implemented in a tool illustrated in FIGS. 2 to 4 and implemented using the technique of FIG. 1 to include at least some of the operations shown in FIG. 5.

At block 181, a computing apparatus receives first inputs from a user, where the first inputs are representative of first aspects of an object shown in a first frame of video image.

For example, the video frames 110 of a video clip is played forward or in reverse in a graphical user interface, the user can stop at any frame as the first frame to label the video image via the first inputs.

For example, the first aspects include an identification of a region, within the first frame, where the object is shown, and a classification of the object. The region can be identified via a bounding box. Optionally, the first aspects can further include an identification of a subset of pixels that collectively represent an image of the object, after other pixels not of the object are being excluded from the subset.

At block 183, an artificial neural network 107 infers/predicts, based at least in part on the first inputs, second aspects of the object shown in a second frame of video image.

For example, the user can instruct the interactive tool to play the video in reverse to label the second frame that is scheduled in the video clip before the first frame. Alternatively, the user can instruct the interactive tool to play the video forward to label the second frame that is scheduled in the video clip after the first frame.

The second aspects inferred for the user in labeling the second frame can include an identification of a region, within the second frame, where the object is shown, and the classification of the object. The region can be identified via a bounding box; and the classification can be the same as the classification given to the object in the first frame. Further, the second aspects further can include an identification of a subset of pixels within the region to indicate that the object is represented by the subset in the region. The subset of pixels forms an image of the object within the bounding box.

At block 185, the computing apparatus presents a graphical user interface, the second aspects of the object inferred using the artificial neural network for the second frame of video image.

For example, the graphical user interface can use the input devices 101 to receive inputs from a user and presents graphical representation of information on a display device 103.

The second aspects represent what the artificial neural network 107 infers/predicts that the user is going to label the second frame using the interactive tool. Since the second aspects are inferred for and presented to the user, the user can decide whether to accept the prediction or provide adjustments. Using the inferences or predictions made by the artificial neural network 107 as a starting point to label the second frame reduces the effort from the user in labeling the second frame.

For example, indicators of the second aspects can be shown overlaid on the second frame of video image in the graphical user interface.

In some implementations, the user specifies a bounding box and a classification of an object in the first frame without specifying the pixels of the object in the first frame; and the artificial neural network 107 infers/predicts the bounding box and classification of the corresponding object in the second frame without using the identification of pixels of the object in the first frame. Optionally, the user further specifies the pixels of the object in the first frame which is further used by the artificial neural network 107 in inferring the second aspects of the object in the second frame.

At block 187, the computing apparatus receives, via the graphical user interface, second inputs from the user, where the second inputs are representative of a correction to the second aspects inferred/predicted by the artificial neural network 107.

For example, the correction can include a change to the identification of the region, within the second frame, where the object is shown.

For example, the correction can include a change to the classification of the object shown in the second frame.

For example, the correction can include a change to the identification of the subset of pixels inferred/predicted to be the image of the object in the second frame.

For example, the correction can include removal of the second aspects from being identified for the second frame. For example, labeling of the object in the second frame may become of no interest and thus can be deleted.

Optionally, the computing apparatus receives, via the graphical user interface, third inputs from the user, where the third inputs are representative of third aspects of a different object shown in the second frame but not in the first frame, such as a bounding box and a classification of the different object.

Figure 7:
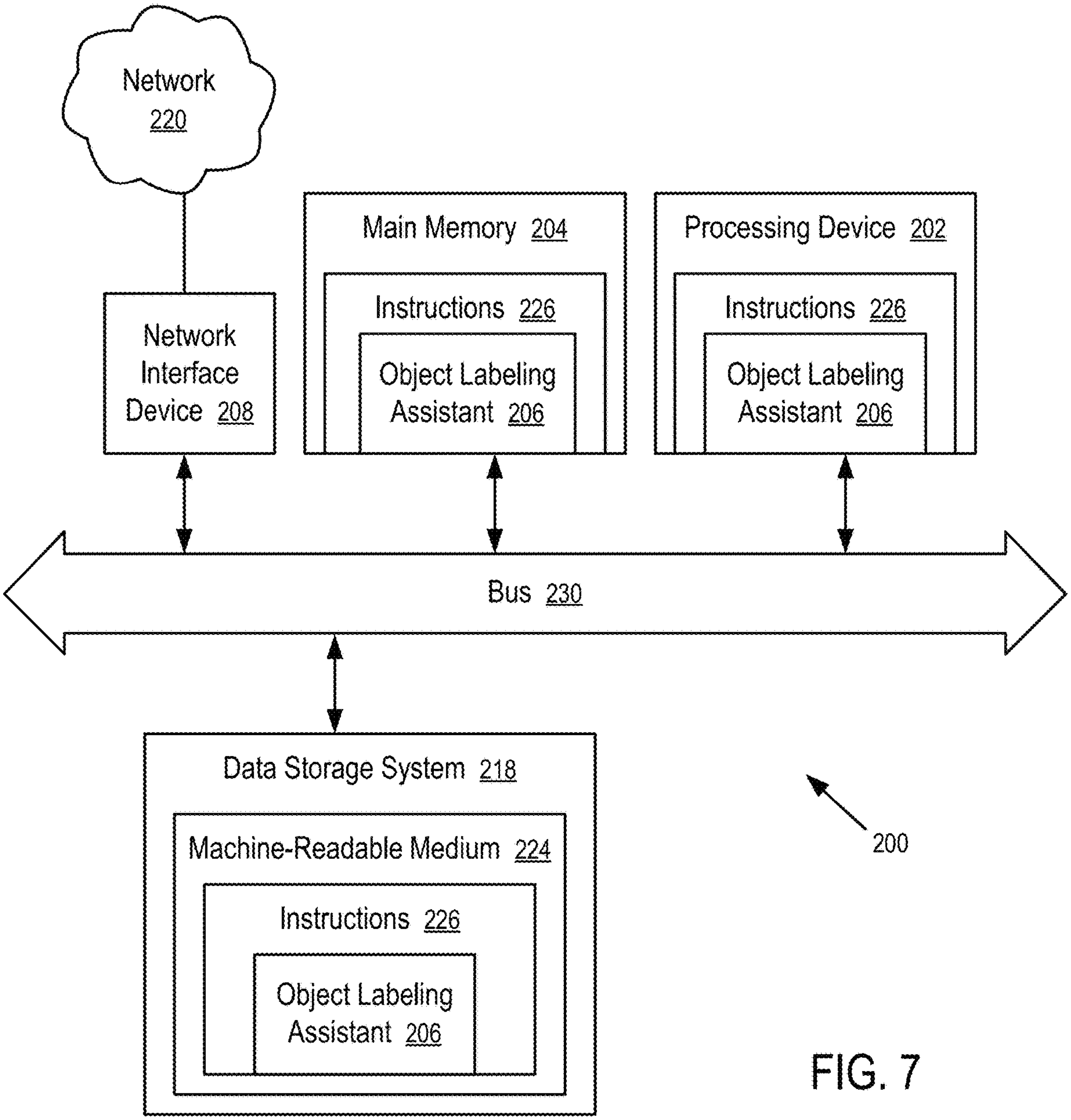
FIG. 7 is a block diagram of an example computer system in which embodiments of the present disclosure can operate.

FIG. 7 illustrates an example machine of a computer system 200 within which a set of instructions, for causing the machine to perform any one or more of the methodologies discussed herein, can be executed. In some embodiments, the computer system 200 can correspond to a host system that includes, is coupled to, or utilizes a memory sub-system or can be used to perform the operations of an object labeling assistant 206 (e.g., to execute instructions to perform operations corresponding to interactive object identification and classification described with reference to FIGS. 1-6). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a server, a personal computer (PC), a tablet PC, a set-top box (STB), a Personal Digital Assistant (PDA), a cellular telephone, a web appliance, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 200 includes a processing device 202, a main memory 204 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 218, which communicate with each other via a bus 230 (which can include multiple buses).

Processing device 202 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 202 can also be one or more special-purpose processing devices such as an application specific integrated circuit (ASIC), a field programmable gate array (FPGA), a digital signal processor (DSP), network processor, or the like. The processing device 202 is configured to execute instructions 226 for performing the operations and steps discussed herein. The computer system 200 can further include a network interface device 208 to communicate over the network 220.

The data storage system 218 can include a machine-readable medium 224 (also known as a computer-readable medium) on which is stored one or more sets of instructions 226 or software embodying any one or more of the methodologies or functions described herein. The instructions 226 can also reside, completely or at least partially, within the main memory 204 and/or within the processing device 202 during execution thereof by the computer system 200, the main memory 204 and the processing device 202 also constituting machine-readable storage media. The machine-readable medium 224, data storage system 218, and/or main memory 204 can correspond to a memory sub-system.

In one embodiment, the instructions 226 include instructions to implement functionality corresponding to an object labeling assistant 206 (e.g., operations of the interactive tools described with reference to FIGS. 1-6). While the machine-readable medium 224 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
- receiving, in a computing apparatus, first inputs from a user, the first inputs representative of first aspects of an object shown in a first frame of video image;
- inferring, using an artificial neural network and based at least in part on the first inputs, second aspects of the object shown in a second frame of video image;
- presenting, via a user interface, the second aspects of the object inferred using the artificial neural network for the second frame of video image;
- receiving, via the user interface, second inputs from the user, the second inputs representative of a correction to the second aspects inferred by the artificial neural network; and
- storing, by the computing apparatus, user identified object labels indicative of the first inputs and separate inferred object labels indicative of at least one of the second aspects that is not corrected based on the second inputs, wherein the separate inferred object labels are not corrected or otherwise changed by the user.

2. The method of claim 1, wherein the first aspects include an identification of a first region, within the first frame, where the object is shown, and a classification of the object.

3. The method of claim 2, wherein the second frame is scheduled in a video clip before the first frame.

4. The method of claim 3, wherein the second aspects include an identification of a second region, within the second frame, where the object is shown, and the classification of the object.

5. The method of claim 4, wherein the second aspects further include an identification of a subset of pixels within the second region to indicate that the object is represented by the subset in the second region.

6. The method of claim 5, wherein the correction includes a change to the identification of the second region, within the second frame, where the object is shown.

7. The method of claim 5, wherein the correction includes a change to the classification of the object shown in the second frame.

8. The method of claim 5, wherein the correction includes a change to the identification of the subset.

9. The method of claim 5, wherein the correction includes removal of the second aspects from being identified for the second frame.

10. The method of claim 5, further comprising:
receiving, via the user interface, third inputs from the user, the third inputs representative of third aspects of a different object shown in the second frame but not in the first frame.

11. The method of claim 2, wherein the second frame is scheduled in a video clip after the first frame.

12. The method of claim 1, wherein the user identified object labels are further indicative of at least one of the second aspects that is corrected based on the second inputs.

13. An apparatus, comprising:
memory storing instructions; and
at least one processor configured via the instructions to:
receive first inputs from a user, the first inputs representative of first aspects of an object shown in a first frame of video image;
infer, using an artificial neural network and based at least in part on the first inputs, second aspects of the object shown in a second frame of video image;
present, via a user interface, the second aspects of the object inferred using the artificial neural network for the second frame of video image;
receive, via the user interface, second inputs from the user, the second inputs representative of a correction to the second aspects inferred by the artificial neural network; and
store user identified object labels indicative of the first inputs and separate inferred object labels indicative of at least one of the second aspects that is not corrected based on the second inputs, wherein the separate inferred object labels are not corrected or otherwise changed by the user.

14. The apparatus of claim 13, wherein the user interface includes a graphical user interface having one or more input devices to receive inputs from the user and a display device to present aspects of objects identified in video images.

15. The apparatus of claim 14, wherein the at least one processor is configured to overlay indicators of the second aspects over the second frame of video image.

16. The apparatus of claim 15, wherein the first aspects include a bounding box for the object shown in the first frame and a classification of the object shown in the first frame; and the second aspects include identification of a first subset of pixels within a bounding box in the second frame, the first subset representative of an image of the object within the second frame.

17. The apparatus of claim 16, wherein the first aspects further include identification of a second subset of pixels within the bounding box for the object shown in the first frame; and the second aspects are inferred by the artificial neural network based at least in part on the second subset.

18. The apparatus of claim 16, wherein the first subset is inferred by the artificial neural network without identification, by the user, of a second subset of pixels, representative of an image of the object, within the bounding box for the object shown in the first frame.

19. A non-transitory computer readable storage medium storing instructions which, when executed by a microprocessor in a computing device, causes the computing device to perform a method, comprising:
presenting a graphical user interface of an interactive tool;
showing a first frame of a video clip in the graphical user interface;
receiving, via the graphical user interface, first user inputs labeling first aspects of an object in the first frame;
inferring, using an artificial neural network and based at least in part on the first user inputs, second aspects to be labeled for the object in a second frame of the video clip;
presenting, in the graphical user interface, the second frame with the second aspects inferred using the artificial neural network for the second frame of the video clip;
receiving, via the graphical user interface, second inputs to confirm or modify the second aspects inferred using the artificial neural network, wherein one of the second inputs comprises an input to delete an identification of an object that is not of interest in the second frame; and
storing user identified object labels indicative of the first inputs and separate inferred object labels indicative of at least one of the second aspects that is not corrected based on the second inputs.

20. The non-transitory computer readable storage medium of claim 19, wherein the first frame and the second frame are adjacent to each other in a sequence of images in the video clip; and the second aspects include a bounding box of the object in the second frame, a classification of the object, and an identification of pixels within the bounding box and representative of an image of the object within the bounding box.

21. The non-transitory computer readable storage medium of claim 18, wherein the first user inputs include a bounding box of the object in the first frame; and the method further comprises:
determining pixels that are within the bounding box in the first frame and that are representative of an image of the object in the first frame.

* * * * *